United States Patent [19]

Kawamura et al.

[11] Patent Number: 4,864,326
[45] Date of Patent: Sep. 5, 1989

[54] DUAL BEAM RECORDER

[75] Inventors: Naoto Kawamura; Takashi Kitamura, both of Yokohama; Shinichi Ohta, Tokyo; Yuji Nishigaki, Odawara, all of Japan

[73] Assignee: Canon Kabushiki Kaisha, Tokyo, Japan

[21] Appl. No.: 140,631

[22] Filed: Jan. 4, 1988

Related U.S. Application Data

[63] Continuation of Ser. No. 839,519, Mar. 14, 1986, abandoned.

[30] Foreign Application Priority Data

Mar. 18, 1985 [JP] Japan .................................. 60-52179
Mar. 19, 1985 [JP] Japan .................................. 60-53354

[51] Int. Cl.$^4$ ........................ G01D 15/14; G11B 7/09; H04N 1/21
[52] U.S. Cl. .................................. 346/108; 346/76 L; 358/75; 358/296; 358/298; 369/45; 369/103
[58] Field of Search ...................... 346/1.1, 76 L, 108; 369/45, 103; 358/296, 298, 45

[56] References Cited

U.S. PATENT DOCUMENTS

| | | | |
|---|---|---|---|
| 4,419,690 | 12/1983 | Hammes | 358/75 |
| 4,423,426 | 12/1983 | Kitamura | 346/108 |
| 4,428,075 | 1/1984 | Hazel et al. | 369/45 |
| 4,530,080 | 7/1985 | Aoi et al. | 369/45 X |
| 4,680,745 | 7/1987 | Ota et al. | 369/45 |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A recorder has a beam generator for generating a beam to form a dot image on a record medium. The beam generator has first and second beam generation sources to generate first and second beams and forms each dot by using both of the first and second beams.

15 Claims, 13 Drawing Sheets (a) REF CLOCK 52
(b) B D SIG 55
(c) PIXEL CLOCK 51
(d) SCREEN CLOCK 54
(e) DIGITAL DATA 37
(f) ANALOG VIDEO SIG 53
(g) INPUT SIG AT COMPARATOR 46
(h) PWM OUTPUT SIG

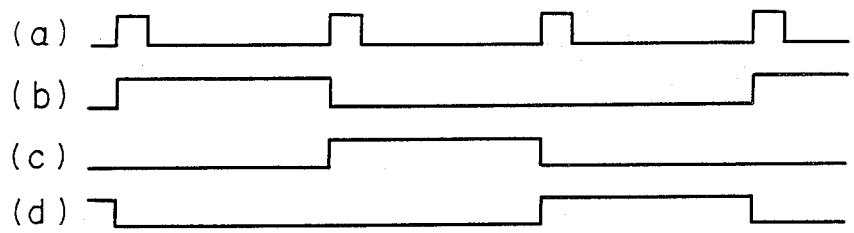
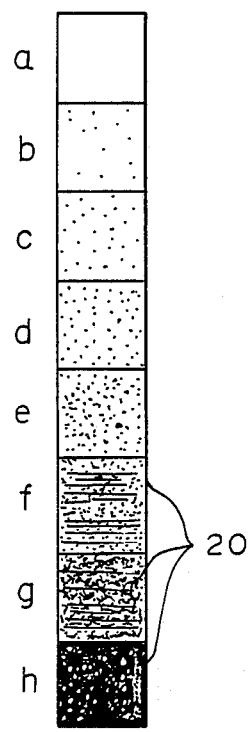
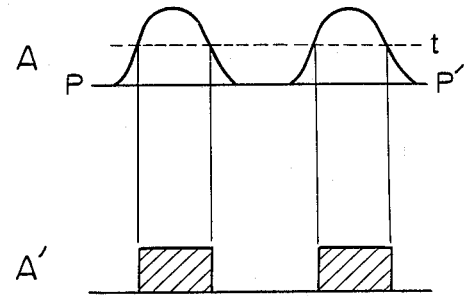
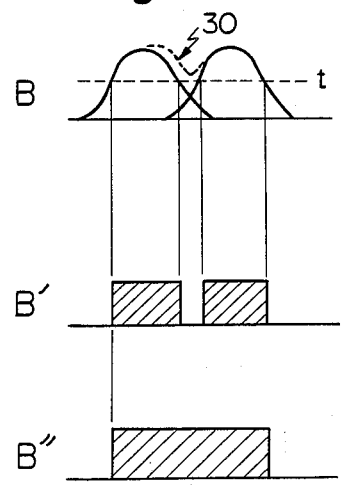

Fig. 25A
Fig. 25B
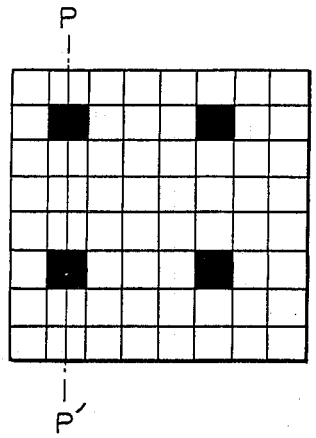
Fig. 25C
Fig. 25D
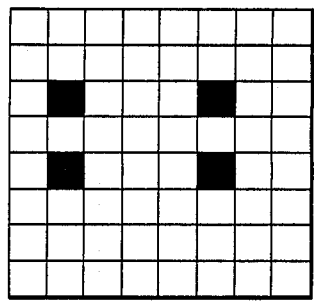
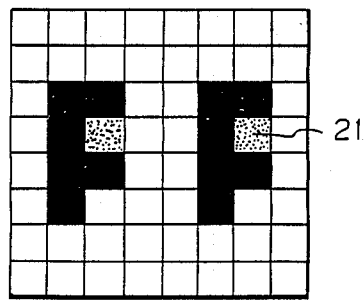

DUAL BEAM RECORDER

This application is a continuation of application Ser. No. 839,519 filed Mar. 14, 1986, now abandoned.

BACKGROUND OF THE INVENTION

1. Field of the Invention

The present invention relates to a recorder which records an image on a record medium by a light beam.

2. Related Background Art

A light scan system which uses a laser as a light source and uses a rotating polygon mirror or a vibrating mirror has been widely used in a facsimile machine, a display device and a printer because of its wide scan angle and a small color dispersion. The rotating polygon mirror is frequently used in a high speed scan apparatus. In such a scan apparatus, the scan pitch of scan lines may not be uniform due to an inclination of the rotating polygon mirror, variation of drum rotation speed and vibration of the rotating polygon mirror.

FIG. 24 shows a gray scale of gray level outputs produced by a dither method or a density pattern method. Eight levels a-h of outputs are extractively or selectively shown. A recorder which records at a high image quality hs 64 levels of outputs, for example (Electro-photographing by the dither method and the density pattern method is disclosed in the First Non-Impact Printing Technique Symposium Papers, 1984, page 88 by Kawamura, Kitajima and Kadowaki.)

As seen from FIG. 24, the scan pitch nonuniformity is remarkable in the high image density areas f-h. The reason for this is explained below.

FIG. 25A shows a 4×4 dither threshold matrix for explanation purposes. The threshold matrix of FIG. 25A is of dot concentration type (fatting type) and produces a pseudo-netpoint pattern as an output image as shown in FIG. 25B for a uniform input data D=1 (highlight area on a screen). Assuming that ideal recording without pitch nonuniformity or vibration is effected, the areas corresponding to the level I of the threshold matrix are blackened and a uniform pattern is produced. (The blocks represent positions of pixels to be recorded.)

If the pitch nonuniformity is included and the upper dot in FIG. 25B is shifted one pixel down and the lower dot is shifted one pixel up, the output at the highlighted area of the image is produced as shown in FIG. 25C in which individual dot densities are preserved.

On the other hand, if the input image data to a shadow area is uniformly "3", an output shown in FIG. 25D is produced and black dots continuously appear. An image density increases by the continuous dots. (area 21 in FIG. 25D)

This is explained with reference to FIGS. 26A and 26B. A distribution of light energy in a section P—P' of FIG. 25B is shown by A, and a distribution of blackened toner is shown by A'. When a spatial distance between two dots is large and the light energy distribution in two Gauss beam sections shown by A in FIG. 26A is developed at a development level t, it appears as shown by A'.

On the other hand, when two dots approach each other by the pitch nonuniformity as shown in FIG. 26B, a bottom slope of the combined light energy curve is raised as shown by "30" of B in FIG. 26B. Accordingly, an output B" is produced which has an increased black area compared to an output B' in which two black areas merely approach each other.

It is seen from the above description that the pitch nonuniformity is more prominent in the high image density area than in the intermediate image density area.

Since the pitch nonuniformity significantly affects the print quality, various compensation methods therefor have been proposed. All of those methods use complex optical systems and lead to an increase in cost and reduction of reliability due to the complex structure required for their implementation.

SUMMARY OF THE INVENTION

It is an object of the present invention to provide an improved recorder.

It is another object of the present invention to provide a recorder which presents a high quality reproduced image.

It is other object of the present invention to provide a recorder which can record high quality image information which is free from density variation with a simple construction.

It is a further object of the present invention to provide an improved recorder which uses a laser beam.

Other objects of the present invention will be apparent from the following description of the invention and the appended Claims.

BRIEF DESCRIPTION OF THE DRAWINGS

FIG. 15 is a block diagram of an image data record processing circuit of a second embodiment, FIGS. 22 and 24 show waveforms in the circuit of FIG. 21, FIG. 24 shows a gray scale for gray level outputs, FIG. 25A shows a 4×4 threshold matrix, FIGS. 25B-25D show output images by the threshold matrix shown in FIG. 25A, and FIGS. 26A and 26B show a light energy distribution and a blackened toner distribution in a P—P' plane of FIG. 25B.

DETAILED DESCRIPTION OF THE PREFERRED EMBODIMENTS

Figure 1:
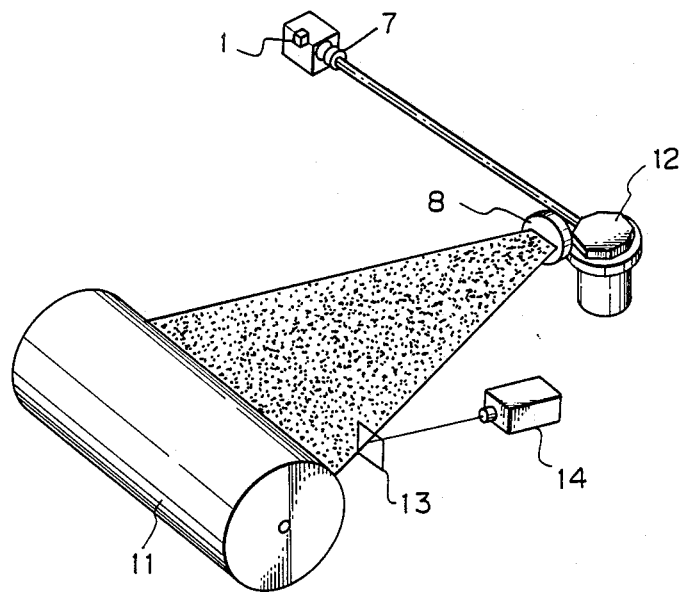
FIG. 1 shows a schematic view of one embodiment of an image recorder of the present invention.

FIG. 1 shows one embodiment of the present invention. Numeral 1 denotes a light source including two independent semiconductor lasers, numeral 7 denotes a collimater lens, numeral 8 denotes a focusing lens, numeral 11 denotes a photo-sensitive drum, numeral 12 denotes a rotating polygon mirror, numeral 13 denotes a reflection mirror and numeral 14 denotes a photo-detector.

Figure 2:
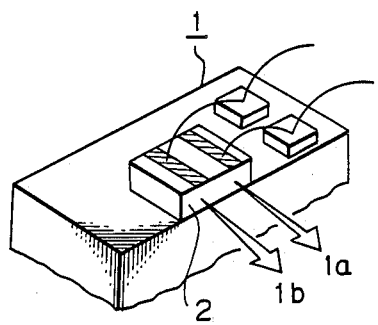
FIG. 2 shows an array laser used as a light source in the embodiment.

As shown in FIG. 2, the light source 1 is constructed by a chip 2 having two independently driven semiconductor laser devices formed on a common wafer. The laser devices emit light beams $1a$ and $1b$, respectively. The emitted beams are collimated by the collimeter lens 7 and deflected by the rotating polygon mirror and focused into a spot on the surface of the photo-conductor drum 11 by the focusing lens 8 so that an electrostatic latent image is formed in accordance with modulation.

Figure 3:
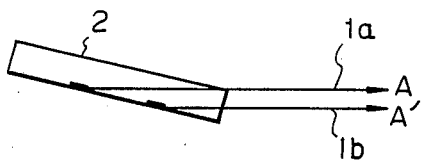
FIG. 3 shows mounting of the array laser of FIG. 2.
Figure 4:
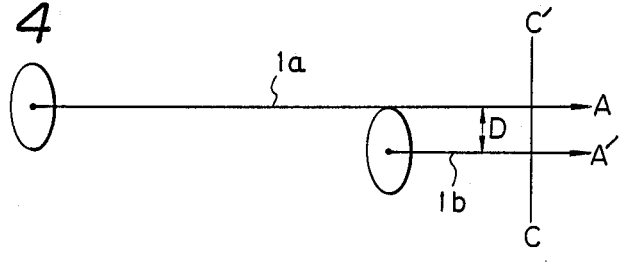
FIG. 4 shows a light beam emitted from the array laser.

The semiconductor laser chip (hereinafter called an array laser) 2 is slightly inclined with respect to a scan direction as shown in FIG. 3 so that light beams A $1a$ and A' $1b$ scan on the photo-conductor drum 11 in a close relation to each other. FIG. 4 shows a spot focused on the scan plane. A distance D between lines by the scan of the two lines is $$D < P$$

where P is scan pitch.

The correction for the pitch variation by using the two focused spots is explained below.

Figure 5A:
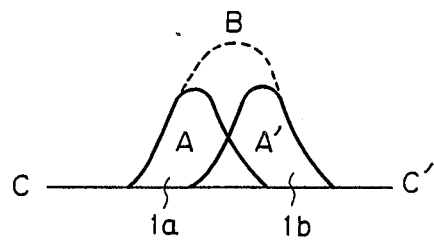
FIGS. 5A–5C show light energy distributions in a C—C' plane of FIG. 4.

FIG. 5A, the two spots A and A' shown in FIG. 4 have the same light energy. A section (C—C' section in FIG. 4) of the time-integrated light energy is shown by a chain line which is the sum B of A and A', and has a peak at a mid-point of A and A'.

Figure 5B:
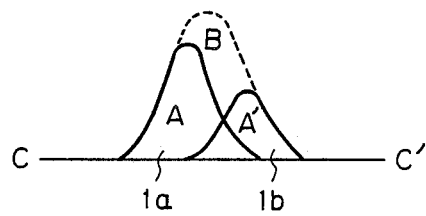
Figure 5C:
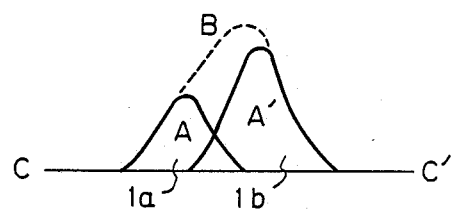

When the light energies of the spots A and A' are different, the peak of the combined light energy B does not appear at the center as shown in FIGS. 5B and 5C but is slightly deviated therefrom. As an intensity ratio of A and A' is changed from 0 to a definite value, the peak position of the combined light energy changes between A and A'. Thus, by setting the distance D between the two spots A and A' so that the peak position is within a stroke of the possible pitch variation, the two beam intensities can be changed so that scan lines of constant pitch are always formed. In the present embodiment, two beams are used to form one dot.

Figure 6:
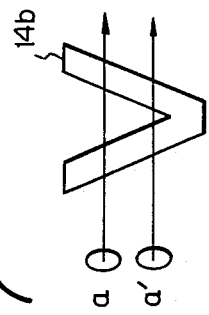
FIG. 6 shows a displacement detector for correcting pitch in the first embodiment.
Figure 7:
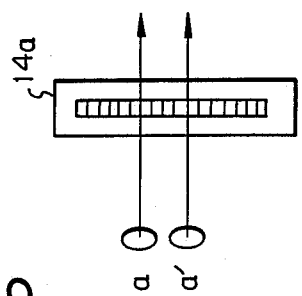
FIG. 7 shows another displacement detector.

FIG. 6 shows a detector for detecting displacement for correcting the pitch. Numeral $14a$ denotes a displacement detector which may be a CCD. It is constructed as a photo-detector 14. A locus of the light beam at a normal position (no inclination of the polygon mirror) through the photo-detector $14a$ is represented by a, and a locus of an actual light which is displaced by the pitch variation is represented by a'. The displacement between a and a' can be detected by reading the output of the photo-detector 14. The displacement may be detected in other ways. FIG. 7 shows another displacement detection method. A photo-detector (not shown) is arranged through a V-shaped slit $14b$. A locus of a normal light beam is represented by a and a locus of the light beam when the pitch variation is included is represented by a'. The time required for the light beam to reach the photodetector through the slit $14b$ when the pitch variation is included is different from that when the pitch variation is not included. Thus, by measuring a difference $\Delta t$ between the detection times of the photo-detector, the displacement of the pitch variation of the light beam can be detected.

Figure 8:
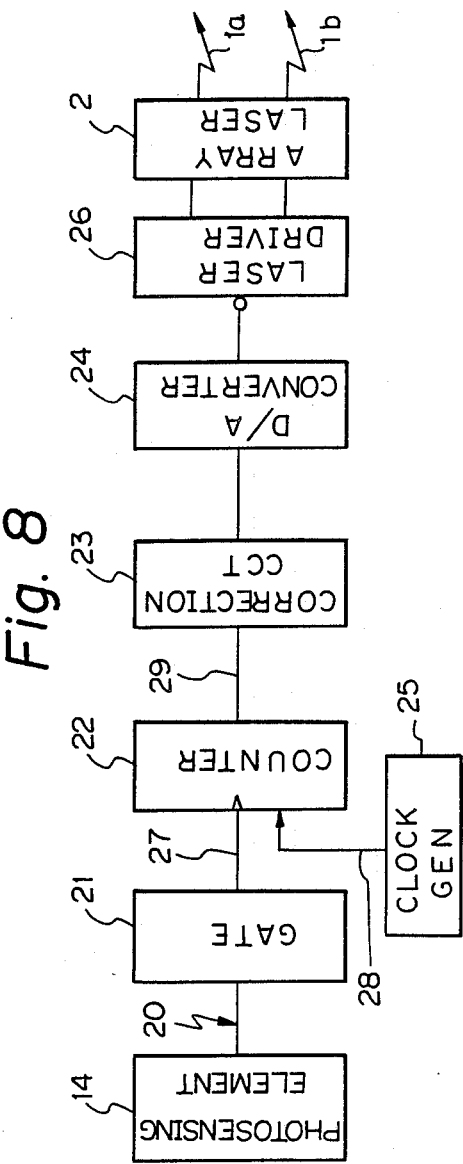
FIG. 8 is a block diagram of a detection signal processing circuit for the signal from the displacement detector shown in FIG. 7.
Figure 9:
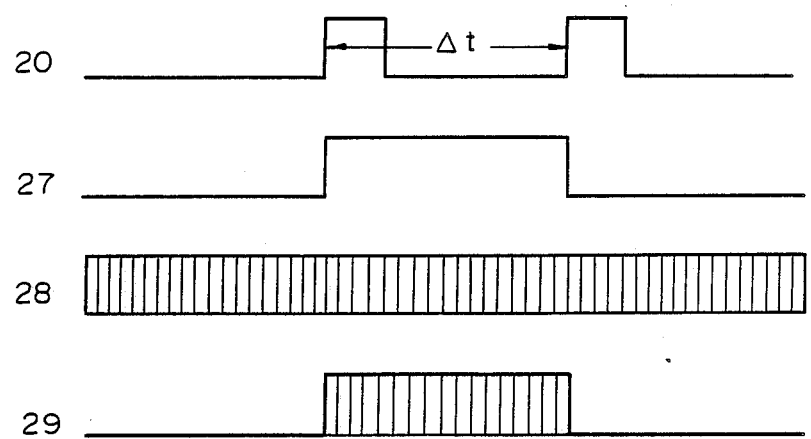
FIG. 9 is a timing chart of the operation of the detection signal processing circuit shown in FIG. 8.

FIG. 8 shows a block diagram of a circuit for determining the displacement by a change of the detection timing of the light beam by the photo-detector, and FIG. 9 shows a timing chart of its operation. A photo-detection signal 20 from the photo-detector is produced at a time interval of $\Delta t$ which is inherent to a scan position, as shown in FIG. 9. The photo-detection signal 20 is supplied to a gate circuit 21 where it is converted to a gate output signal 27 which is ON for the time interval $\Delta t$. The gate output signal 27 is supplied to a counter 22 to which a high frequency clock 28 is applied from a clock generator 25. The counter 22 counts the high frequency clock 28 for the ON period of the gate output signal 27 and supplies a count output 29 to a digital correction circuit 23. The digital correction circuit 23 and a digital-analog conversion circuit 24 generate a difference signal from a reference based on the count output 29 and convert it to a drive level of a drive signal for a laser driver 26. In this manner, an output representing the displacement of the light beam is produced. This detection method is effective to compensate not only the inclination of the rotating polygon mirror but also the deviation of the beam position due to mechanical vibration.

Figure 10:
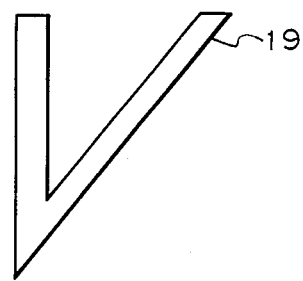
FIG. 10 shows other displacement detector.

To this end, it is necessary that the photo-detector is located at a start position of the scan line. The output from the photo-detector may be used as a cue signal (horizontal synchronization signal) of the beam scan. That is, it may be used as a beam detect (BD) signal to indicate the scan position of the beam. In this case, it is necessary that the slit has a shape shown by an aperture 19 of FIG. 10 and the first photo-detection signal is used as the horizontal synchronization signal of the scan line. A video signal is applied to the laser driver in synchronism with the horizontal synchronization signal. In the present embodiment, one video signal is applied to the beam drivers for the light beams $1a$ and $1b$. By arranging the photo-detector as closely as possible to the start position in the recorded image area, the mechanical vibration having a period of one scan period can be compensated.

Figure 11:
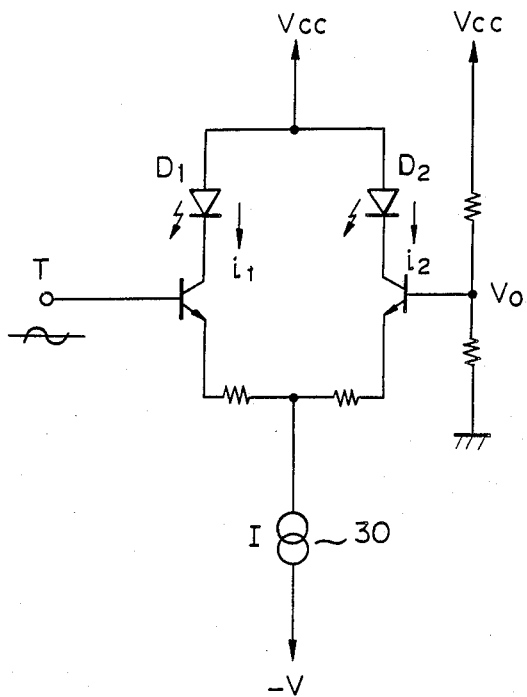
FIG. 11 shows a detailed circuit diagram of a laser driver shown in FIG. 8.
Figure 12:
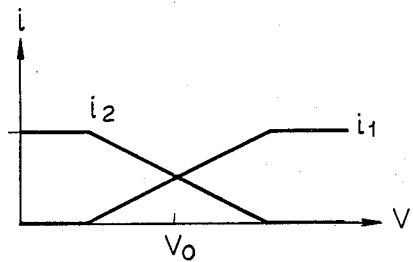
FIG. 12 shows a laser drive current of the laser driver shown in FIG. 11.

FIG. 11 shows the laser drive 26 which distributes the lights of the two semiconductor lasers in accordance with the output from the photo-detector 14. Semiconductor lasers D1 and D2 are connected to a differential circuit which supplies a current determined by a constant current circuit 30. Currents $i_1$ and $i_2$ flowing through the semiconductor lasers D1 and D2 vary as shown in FIG. 12 in accordance with a voltage V applied to a lefthand input terminal T. Thus, by applying the output signal of the D/A converter 24 which processes the signal from the photo-detector, the desired light intensity distribution is obtained. In FIG. 12, $V_o$ represents a voltage applied to the terminal T under an ideal condition in which no pitch variation is included. At this time, the currents $i_1$ and $i_2$ flowing through the semiconductor lasers D1 and D2 are equal.

Figure 13:
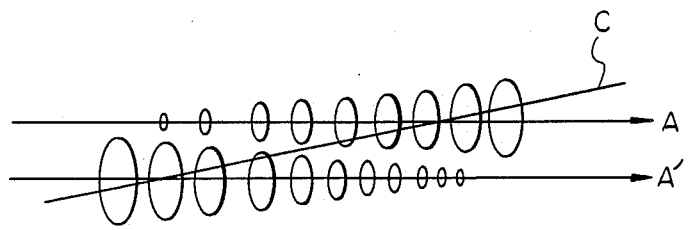
FIG. 13 illustrates an oblique line record control of the first embodiment.

The compensation for the pitch variation of the scan lines has been described. If two beams of different intensities are used, an oblique line C shown in FIG. 13 may be formed. By gradually changing an intensity ratio of the two beams, the displacement between the scan lines can be slightly changed and a saw-tooth pattern which would be produced when the oblique line is produced by a conventional quantization method is eliminated and a high grade oblique pattern can be outputted. While two semiconductor lasers are used in the above description, three or more semiconductor lasers may be used to attain a similar effect.

Figure 14A:
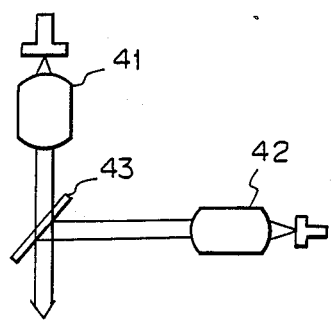
FIG. 14A shows a light source having a semiconductor laser.
Figure 14B:
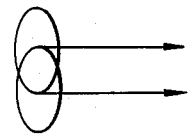
FIG. 14B shows an output light beam spot from the semiconductor laser shown in FIG. 14A.

The array laser 2 is used as the semiconductor lasers in the above description. Alternatively, as shown in FIG. 14A, instead of the array laser, two single lasers 41 and 42 may be used and light beams from those lasers may be combined by a polarization beam splitter 43 having a low light loss. (In this case, the beams emitted from the semiconductor lasers 31 and 32 are deflected and arranged orthogonally to each other.) As a result, two beams are formed closely to each other as shown in FIG. 14B.

A second embodiment of the present invention is now explained with reference to FIGS. 1, 2 and 3.

In the second embodiment, the semiconductor laser chip (array laser) 2 is slightly inclined with respect to the scan direction as shown in FIG. 3 and the two light beams A 1a and A' 1b scan on the photoconductor drum 11. The second embodiment differs from the first embodiment in that the distance D between the scan lines by the two spots is set to meet a relation of $$D > P$$

where P is the scan pitch.

The compensation for the pitch variation by the two focused spots is explained with reference to a block diagram of a signal processing circuit shown in FIG. 15.

In the present embodiment, only a highlight area having a low image density is used. However, in order to increase the image density, exposure is done two times by the two lasers and latent images are overwritten. That is, two beams are used to form one dot.

Figure 16:
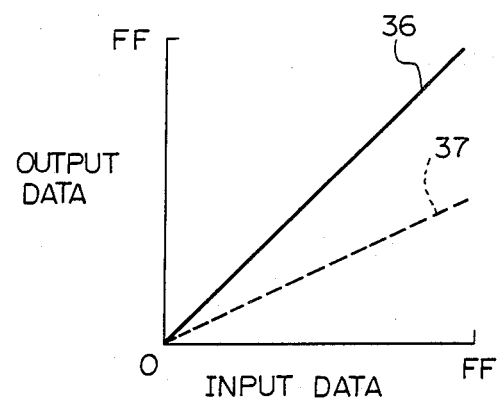
FIG. 16 shows a γ-transform characteristic of a γ-transform circuit in the second embodiment.
Figure 17:
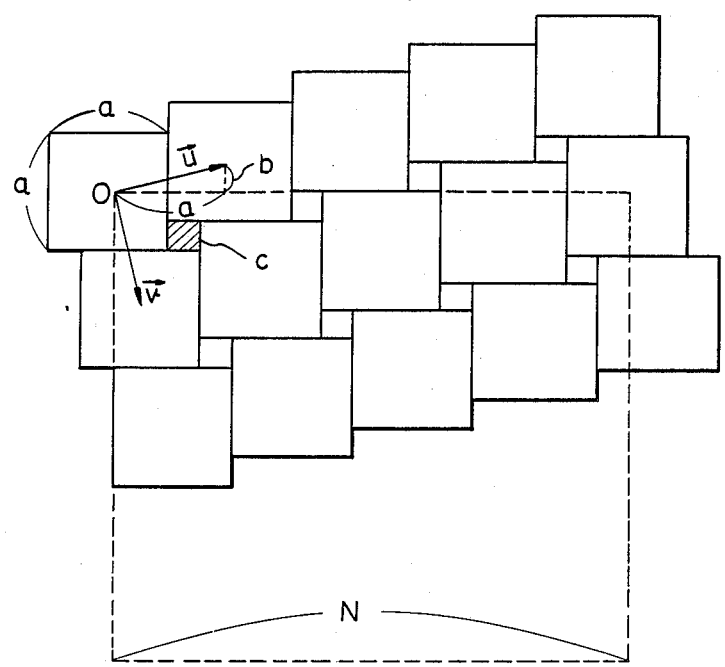
FIGS. 17 and 18 illustrate dither processing of a dither circuit in the second embodiment.

An input image data 36 is supplied from an image data generator 31 such as an image input device (reader) or an image file (disc memory) and has a density data (or intensity data) of 8 bits per pixel. The image data 36 is transformed by a $\gamma$ transform circuit 32 to a linear $\gamma$ having a gradient of $\frac{1}{2}$ so that a maximum density is reduced to approximately one half of normal. FIG. 16 shows a relationship between the input data 36 to the $\gamma$ transform circuit 32 and an output data 37. As shown, a $\gamma$-transformed output data signal 37, shown by a broken line, which has one half of the gradient of the input data signal 36 is produced. This is attained by a look-up table ROM (or RAM) having the characteristic shown by line 37 in FIG. 16.

The density-transformed output data signal 37 is supplied to a line memory 33 which is used to delay the output data signal 37 for a plurality of line periods for overwriting. Thus, the capacity of the line memory 33 is determined in consideration of the distance between the two beams of the array laser 2. The data signal 37 delayed by the line memory 33 is supplied to a dither circuit B 34b. On the other hand, the output data signal 37 without delay is supplied to a dither circuit A 34a.

The signals (8-bit density signals) applied to the dither circuits are dither processed by threshold matrices so that they are compressed to 1-bit binary data or 2-bit multi-value data. They are compressed to comply with a printer characteristic. (Optimum threshold matrices to the printer characteristic are selected.) The output data from the dither circuits A 34a and B 34b are supplied to laser drivers 35a and 35b, respectively, which drive the array laser 2 in accordance with the input data.

In the overwriting by the two lasers, high registration precision is required. Otherwise, resolution will be lowered. One approach to improve the registration is to render the number of lines of the line memory 33 variable so that the adjustment can be done by a unit of one line. Alternatively, the inclination of the array laser 2 shown in FIG. 3 may be mechanically adjusted. In this case, a finer adjustment (smaller than one line width) can be attained. The registration in the main scan direction can be easily improved. A well-known cue signal (horizontal synchronization signal) which indicates a beam scan position is generated by using the reflection mirror 13 and the photo-detector 14 shown in FIG. 1. For the array laser 2, as many cue signals as the generated and the respective cue signals are generated as the horizontal synchronization signals for the respective arrays.

The binarization circuits or dither circuits 34a and 34b shown in FIG. 15 are explained in detail. If the dither circuits A 34a and B 34b are constructed by the same threshold matrix, a kind of beat called a Moire phenomenon may be generated by overlapping the output images. In order to prevent the Moire phenomenon, it is necessary to arrange the respective threshold matrices to have a screen angle so that the beat frequency due to overlapping is driven out to a high frequency region.

Net point dots having the screen angle may be formed by arranging basic net points (called basic cells) comprising axial pixels in a staggered manner. Gap areas C created thereby may be assigned to appropriate cells. The screen angle 8 is given by $$\theta = \tan^{-1}\left(\frac{b}{a}\right)$$

$$\vec{u} = (a, b)$$

where $\vec{u}$ is a displacement vector. A size N of a square threshold matrix corresponding to one period of the net points is represented by $$N = LCM(a, b) \times \left(\frac{b}{a} + \frac{a}{b}\right)$$

where LCM (a, b) represents a least common multiple of a and b.

Figure 18:
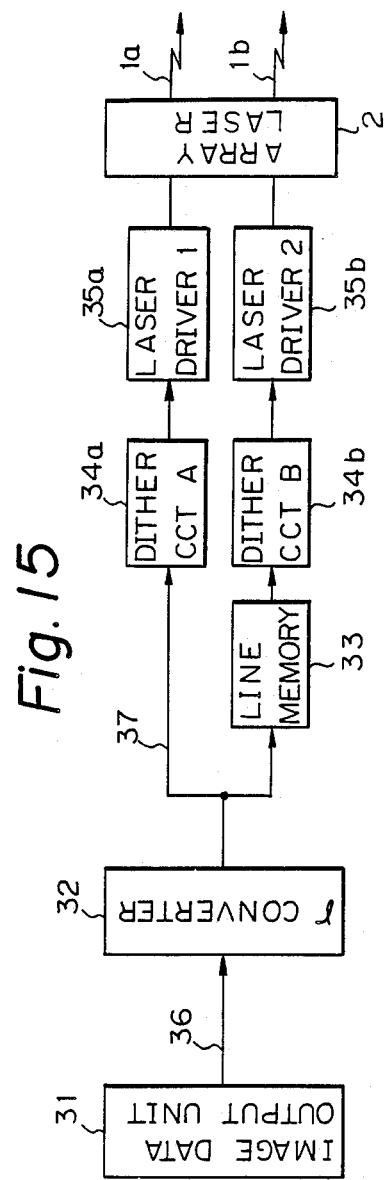

FIG. 18 shows matrix sizes N, screen angles $\theta$, net point pitches $|\vec{u}|$, numbers of pixels included in the basic cell $N_o = a^2 + b^2$, for the basic cell sizes of $2 \times 2$ to $5 \times 5$.

In order to reduce a burden to the hardware, it is desirable to use as small size matrix as possible. In the present embodiment, $a = 4$ and $b = 2$ are used, which allows a large number of pixels ($N_o$) in the basic cell and a large matrix size ($N = 10$).

By using the matrix size of 10×10 for a=4 and b=2, the net point pattern having the screen angle of 26.6° is formed. A screen angle of −26.6° can be attained by forming a threshold matrix of left or right mirror image (a=4, b=−2). Other screen angles may also be selected in the present invention.

By selecting different screen angles, the Moire phenomenon is prevented in overlapping the two images. Since the individual dots are overlapped randomly, the density of the combined image is uniform.

In this manner, a high quality of image is recorded by suppressing the exposure at the high density which easily causes the pitch variation of the image and performing the exposure at the low density which hardly causes the pitch variation of the image.

In the above description, two semiconductor lasers (array laser) are used to emit two laser beams. Alternatively, as shown in FIG. 14A light beams from two single lasers 41 and 42 may be combined by a polarization beam splitter 43. In the above description, the image is reproduced by the pseudo-net point method by using the dither matrices, although it may be reproduced by a one-dimension line screen method. In this case, it is necessary to change the direction of the line (angle) to prevent the Moire fringing. To this end, the thresholds of the threshold matrices may be designed at line angles of 45° and −45° (135°).

In the above description, the output device is the electro-photographing recorder and the images are overlapped in the latent images, although they may be overlapped in the developed toner images.

Figure 19:
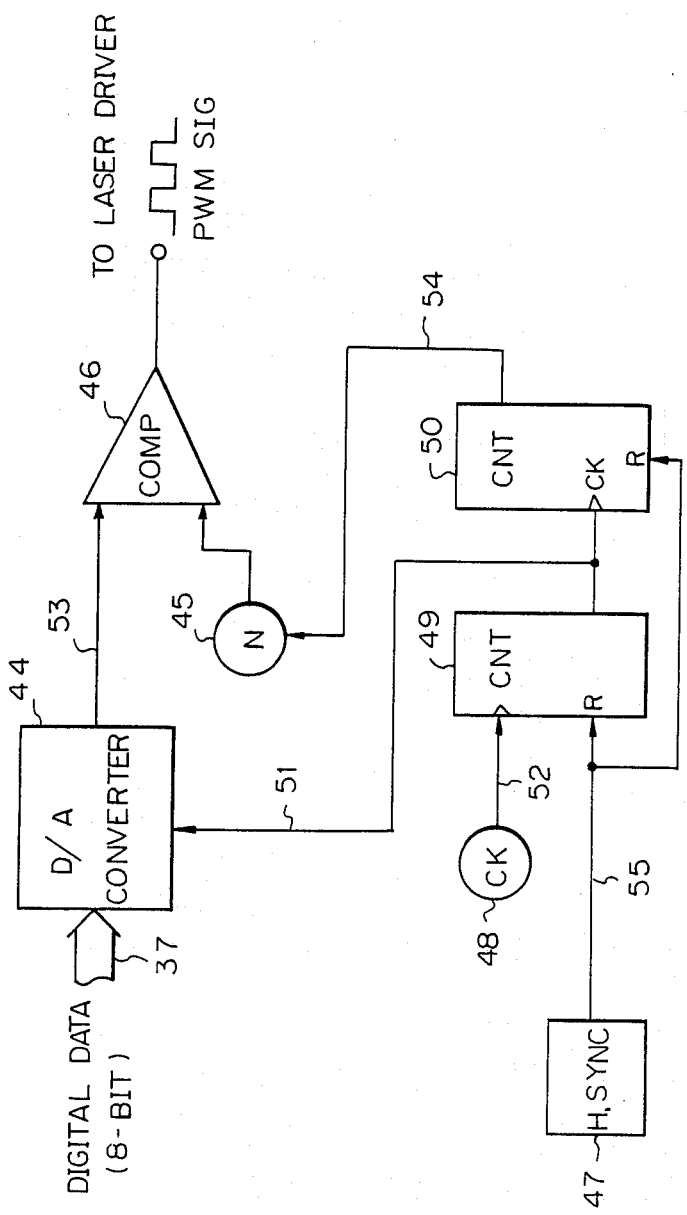
FIG. 19 shows a gray level processing circuit which uses a ramp voltage.

An image output of a higher tonality can be reproduced by using gray level processing circuits which use ramp signals as shown in FIG. 19 for the laser drivers 35a and 35b in place of the dither circuits 34a and 34b of FIG. 15. In FIG. 19, an 8-bit density signal 37 from a γ-transform circuit 32 is converted to an analog signal by a digital-analog converter 44, and each pixel is sequentially applied to one terminal of a comparator 46. A ramp voltage generator 45 generates a pulse such as a ramp wave once for three pixels of the digital data and supplies it to the other terminal of the comparator 46. A reference clock 52 from an oscillator (reference clock generator) 48 is frequency-divided by a factor of 8 by a counter 49 in synchronism with a horizontal synchronization signal generated for each line by a horizontal synchronization signal generator 47 (including the photo-detector 14 of FIG. 1). It is used as a transfer clock of the digital data and a latch timing signal to the D/A converter 44.

The comparator 46 compares the analog image signal with the ramp signal to produce a pulse width modulated binary image data. The pulse width modulated image signal is applied to a laser driver which modulates the laser beam. The laser beam is turned on and off in accordance with the pulse duration so that a gray level image is formed on the photo-conductor drum 11.

Figure 20:
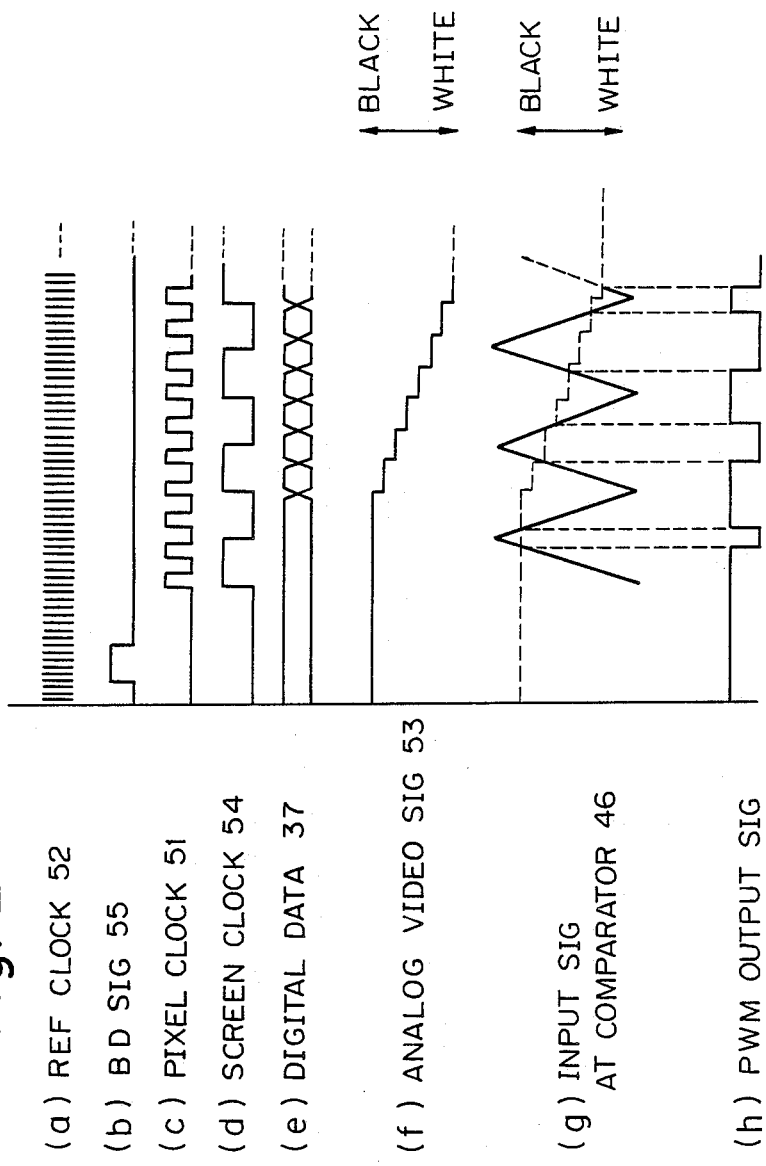
FIG. 20 shows waveforms in the circuit of FIG. 19.

FIG. 20 shows signal waveforms in the circuit of FIG. 19. FIG. 20a shows the basic reference clock 52 of the oscillator 48. FIG. 20b shows the horizontal synchronization signal (BD signal) 55 and FIG. 20C shows the pixel clock 51 which was frequency-divided from the reference clock of the oscillator 48 by the counter 49. The pixel clock 51 shown in FIG. 20c is generated by frequency-dividing the reference clock 52 by a factor of 8 by the counter 49 in synchronism with the horizontal synchronization signal, and it is supplied to the D/A converter 44 and used as the transfer clock for the pixel data 37. FIG. 20d shows the screen clock 54 which is generated once for every three pixel clocks by frequency-dividing the pixel clock 51 from the counter 49 by a factor of 3 by the counter 50. The screen clock 54 of FIG. 20d is the synchronization signal to generate the ramp voltage and it is supplied to the ramp voltage generator 45. FIG. 20e shows the digital image data (code data) 37 which is the output of the γ-transform circuit 32. FIG. 20f shows the image data 53 D/A converted by the D/A converter 44. As shown, the analog pixel data are produced in synchronism with the pixel clock 51. As shown, the density reduces as it goes down on the drawing.

On the other hand, the ramp voltage of the ramp voltage generator 45 is generated in synchronism with the screen clock 54 of FIG. 20d as shown by a solid line in FIG. 20g, and it is applied to the comparator 46. Broken lines in FIG. 20g show the analog pixel data 53 of FIG. 20f and it is compared with the ramp voltage from the ramp voltage generator 45 by the comparator 46, which produces the pulse width modulated binary data (PWM signal) as shown in FIG. 20h.

In the circuit of FIG. 19, the digital image data is converted to the analog image data which is compared with the ramp voltage of the predetermined period. Thus, essentially continuous pulse width modulation is attained and the high tonality image output is produced.

The ramp voltage generator may be constructed by a simple integration circuit including a resistor and a capacitor.

When the ramp voltage is generated in synchronism with a certain number of pixels as shown in FIG. 19, it may be preferable to shift the synchronization signal for the generation of the ramp voltage by one pixel for each scan line.

Figure 21:
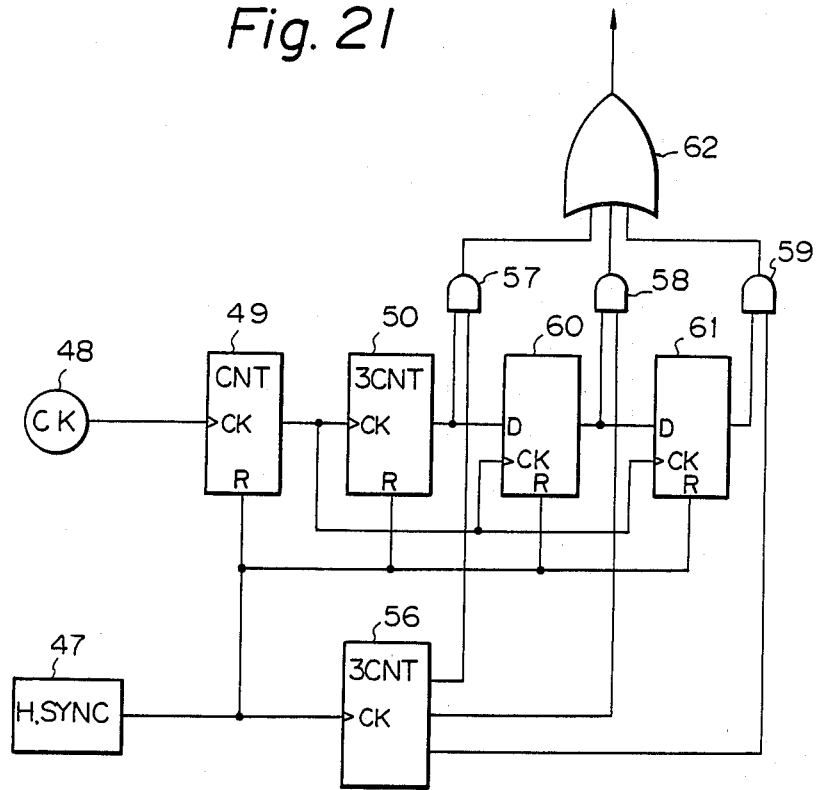
FIG. 21 shows a circuit for generating ramp waveforms having different phases for respective scan lines.

FIG. 21 shows a circuit which allows shifting of the synchronization signal (screen clock) for the generation of the ramp voltage by one pixel for each line.

In FIG. 21, those blocks having the same functions as those of FIG. 19 are designated by like numerals. The scale-of-three counter 50 generates the screen clock once for every three pixel clocks in synchronism with the horizontal synchronization signal. D-type flip-flops 60 and 61 produce the screen clocks which are phase-shifted by one pixel clock and two pixel clocks, respectively, relative to the screen clock generated by the counter 50, based on the screen clock generated by the counter 50. Three different line gate signals are produced by the scale-of-three counter 56 based on the output from the horizontal synchronization signal generator 47, and they are applied to AND gates 57, 58 and 59, respectively. Each time the horizontal synchronization signal is applied, the gate signal is sequentially produced from the terminals of the counter 56 and applied to the AND gate 57, 58 or 59. Thus, the screen clock for the generation of the ramp voltage is switched for each line. The screen clocks produced by the gates 57, 58 and 59 are supplied to the ramp voltage generator 45 through an OR gate 62.

FIG. 22a shows the pixel clock generated by the counter 49, and it corresponds to the signal shown in FIG. 20c. FIGS. 22b, 22c and 22d show the output clocks of the scale-of-three counter 50, and D flip-flops 60 and 61, respectively. The screen clock of FIG. 22b corresponds to the clock shown in FIG. 20d. FIG. 23 shows the horizontal synchronization signal and the output of the scale-of-three counter 56. As the horizontal synchronization signal is applied to the scale-of-three counter 56 at the timing shown in FIG. 23a, the scale-of-three counter 56 generates one of the three line gates shown in FIGS. 23b, 23c and 23d. Accordingly, one of the screen clocks shown in FIGS. 22b, 22c and 22d is selected for each line and it is applied to the ramp voltage generator 45.

By using the screen clock generator of FIG. 21, the ramp voltage having phase shifted by one pixel clock for each line can be generated. As a result, the image having a predetermined screen angle is reproduced.

Where the screen clock generator shown in FIG. 21 is provided for each of the laser drivers 35a and 35b, noise can be further eliminated from the reproduced image if the screen clock generators are adjusted such that the laser beams 1a and 1b form different screen angles. The screen angles formed by the laser beams 1a and 1b can be rendered different by changing the output order of the line gate signals from the scale-of-three counter 56 by the screen clock generator.

In the present embodiment, the ramp voltage is used although other signals such as a sawtooth wave, sine wave or pedestal wave may be used.

In the present embodiment, the pulse is generated once for every three pixel clocks although the period may be longer or shorter. If a circuit response is sufficiently high, one pulse may be generated for each pixel.

The present invention is not limited to the illustrated embodiments but various modifications may be made within a scope of the claim.

I claim:

1. A recorder comprising:
a record medium on which an image is to be recorded;
beam generation means for generating a beam to form an image on said record medium, wherein said beam generation means includes first and second beam generation sources for generating first and second beams, respectively, and said first and second beams generated from said first and second beam generation sources, respectively, are combined to form an image on said record medium;
detection means for detecting an actual displacement of the beam directed to said record medium; and
control means for controlling the light energy of each of said first and second beams to change a peak position of the combined beams in accordance with the actual displacement detected by said detection means.

2. A recorder according to claim 1 wherein said detection means includes photo detection means for detecting said beam.

3. A recorder according to claim 2 wherein said detection means is arranged at a scan position of said beam, and the detection output of said detection means is used as a synchronization signal to form the image on said record medium.

4. A recorder according to claim 1 wherein said recording medium includes a photo-sensitive drum, and said first and second beam generation sources include first and second semiconductor laser devices.

5. A recorder according to claim 1, wherein a distance between the centers of focused spots of said first and second beams on said record medium is less than a scan pitch of said beam.

6. A recorder comprising:
image data output means;
first and second half tone processing means for performing respective first and second half tone processing of the same image data outputted from said image data output means; and
first and second image forming means for forming an image on a record medium in accordance with the outputs from said first and second half tone processing means, respectively, wherein said first and second image forming means include first and second beam generation sources for generating first and second beams, respectively, said first and second beam generation sources modulating the beams in accordance with the data produced by said first and second half tone processing means, respectively, so as to form a reproduced image on said record medium.

7. A recorder according to claim 6, further comprising $\gamma$-conversion means for converting the density of the image data produced by said output means, wherein the output of said $\gamma$-conversion means is supplied to both of said first and second half tone processing means.

8. A recorder according to claim 7, further comprising delay means for delaying the output of said $\gamma$-conversion means, wherein the output of said delay means is applied to said second half tone processing means.

9. A recorder according to claim 6, wherein said record medium includes a photosensitive drum, and said first and second beam generation sources include first and second semiconductor laser devices.

10. A recorder according to claim 6, wherein said first and second half tone processing means perform respective first and second processes of said image data so as to reproduce an image having a different screen angle on said record medium.

11. A recorder according to claim 10, wherein said first and second half tone processing means perform respective first and second half tone processes by using first and second threshold matrices having different arrangements from each other.

12. A recorder according to claim 10, wherein said first and second half tone processing means perform respective first and second half tone processes by using first and second pulse patterns different from each other.

13. A recorder according to claim 12, wherein said first and second pulse patterns are different in phase from each other.

14. A recorder according to claim 13, wherein said first and second pulse patterns are respective first and second right angle waves having different phases from each other.

15. A recorder according to claim 7, wherein said $\gamma$-conversion means reduces a density level of image data inputted therein.

* * * * *

UNITED STATES PATENT AND TRADEMARK OFFICE
CERTIFICATE OF CORRECTION

PATENT NO. : 4,864,326

DATED : September 5, 1989

INVENTOR(S) : NAOTO KAWAMURA, ET AL.　　　　　　Page 1 of 2

It is certified that error appears in the above-identified patent and that said Letters Patent is hereby corrected as shown below:

COLUMN 1

Line 26, "hs" should read --has-- and "example" should read --example.--.

COLUMN 3

Figure 22:
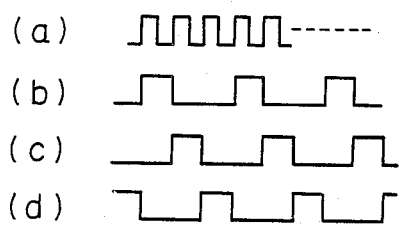

Line 1, "FIGS. 22 and 24" should read --FIGS. 22 and 23--.
　　Line 24, "collimeter lens" should read --collimater lens--.

COLUMN 6

Line 24, "the gener-" should read --the number of arrays (two in the present embodiment) are gener- --.
　　Line 39, "axial pixels" should read --aXa pixels--.
　　Line 41, "screen angle 8" should read --screen angle $\theta$--.

COLUMN 7

Line 61, "FIG. 20C" should read --FIG. 20c--.

UNITED STATES PATENT AND TRADEMARK OFFICE
CERTIFICATE OF CORRECTION

PATENT NO. : 4,864,326

DATED : September 5, 1989

INVENTOR(S) : NAOTO KAWAMURA, ET AL.

It is certified that error appears in the above-identified patent and that said Letters Patent is hereby corrected as shown below:

COLUMN 9

Line 29, "claim." should read --claims.--.
    Line 30, "I claim:" should read --We claim:--.
    Line 51, "photo detection" should read --photo-detection--.
    Line 60, "beam:" should read --beam--.

COLUMN 10

Line 56, "right angle waves" should read --triangle waves--.

Signed and Sealed this

Fourteenth Day of May, 1991

*Attest:*

HARRY F. MANBECK, JR.

*Attesting Officer*  *Commissioner of Patents and Trademarks*